US010787982B2

(12) United States Patent
Kaserer et al.

(10) Patent No.: US 10,787,982 B2
(45) Date of Patent: Sep. 29, 2020

(54) SYSTEM AND METHOD FOR CALIBRATING A VEHICLE COMPONENT

(71) Applicant: AVL LIST GMBH, Graz (AT)

(72) Inventors: Thomas Kaserer, Graz (AT); Thomas Dobes, Graz (AT); Gerhard Storfer, Graz (AT); Stefan Thamerl, Graz (AT); Mark Mutschler, Heilbronn (DE)

(73) Assignee: AVL LIST GMBH, Graz (AT)

( * ) Notice: Subject to any disclaimer, the term of this patent is extended or adjusted under 35 U.S.C. 154(b) by 32 days.

(21) Appl. No.: 15/774,098

(22) PCT Filed: Nov. 10, 2016

(86) PCT No.: PCT/EP2016/077365
§ 371 (c)(1),
(2) Date: Sep. 24, 2018

(87) PCT Pub. No.: WO2017/081215
PCT Pub. Date: May 18, 2017

(65) Prior Publication Data
US 2019/0010888 A1 Jan. 10, 2019

(30) Foreign Application Priority Data

Nov. 10, 2015 (DE) .................. 10 2015 014 478

(51) Int. Cl.
F02D 41/24 (2006.01)
B60W 20/15 (2016.01)
(Continued)

(52) U.S. Cl.
CPC ......... F02D 41/2432 (2013.01); B60W 10/06 (2013.01); B60W 20/15 (2016.01);
(Continued)

(58) Field of Classification Search
CPC .. F02D 41/24; F02D 41/2422; F02D 41/2432; F02D 41/2467; F02D 41/28;
(Continued)

(56) References Cited

U.S. PATENT DOCUMENTS

2015/0154817 A1* 6/2015 Storfer ............... G07C 5/08
701/29.1

FOREIGN PATENT DOCUMENTS

DE 102011116730 4/2012
DE 102013003493 8/2014
(Continued)

OTHER PUBLICATIONS

International Search Report prepared by the European Patent Office dated Jan. 31, 2017, for International Application No. PCT/EP2016/077365.

(Continued)

Primary Examiner — John Kwon
Assistant Examiner — Johnny H Hoang
(74) Attorney, Agent, or Firm — Sheridan Ross P.C.

(57) ABSTRACT

The invention relates to a system and to a method for calibrating a controller of a vehicle component, in particular at least of one section of a drivetrain of a motor vehicle, preferably of an internal combustion engine, wherein control data, on the basis of which the vehicle component is controlled, are stored in the controller, and wherein the method comprises the following working steps: identifying at least one first vehicle parameter of a plurality of vehicle parameters of calibrated variants of the vehicle component, which parameter has different values for different calibrated variants, preferably a rated power, an emission value and/or a market specification; checking, if the calibrated variants differ in terms of the at least one first vehicle parameter, at least one portion of the control data of the calibrated variants (Continued)

Figure 1:
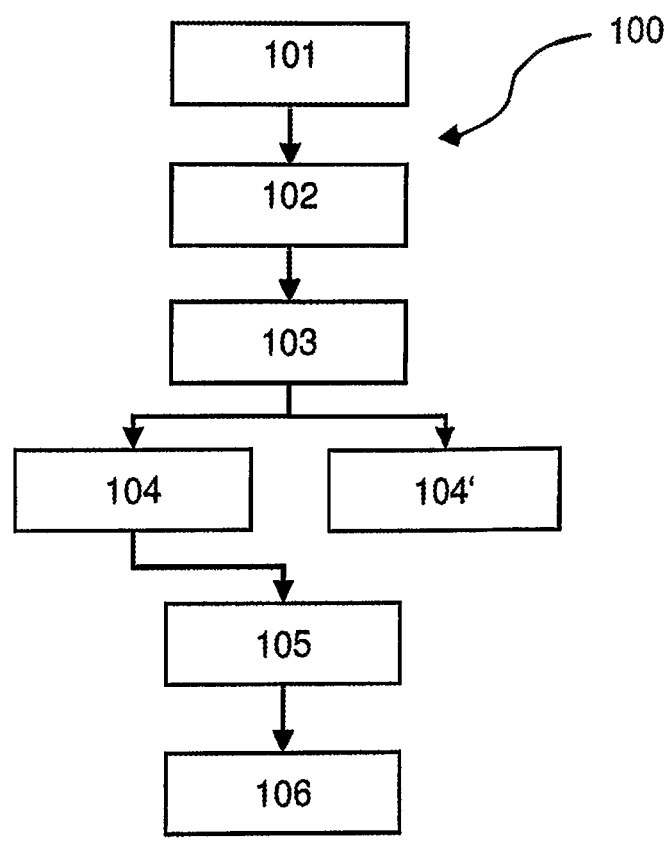

for a relationship with the at least one first vehicle parameter; defining, if a relationship is detected, a calibration function for the at least one portion of the control data on the basis of the relationship with the at least one first vehicle parameter; determining control data of a variant, to be calibrated, of the vehicle component by means of the calibration function in accordance with the at least one first vehicle parameter; and outputting the determined control data, in particular to the controller of the vehicle component.

18 Claims, 5 Drawing Sheets

(51) Int. Cl.
 *B60W 10/06* (2006.01)
 *F02D 41/28* (2006.01)
(52) U.S. Cl.
 CPC ..... *F02D 41/2422* (2013.01); *F02D 41/2467* (2013.01); *F02D 41/28* (2013.01); *B60W 2530/14* (2013.01); *B60W 2540/10* (2013.01)

(58) Field of Classification Search
 CPC .. B60W 10/06; B60W 20/15; B60W 2530/14; G06F 17/40
 USPC .......................................... 701/101, 102, 115
 See application file for complete search history.

(56) References Cited

FOREIGN PATENT DOCUMENTS

WO WO 2013/131836 9/2013
WO WO 2013/182681 12/2013

OTHER PUBLICATIONS

Official Action for European Patent Application No. 16794619.3, dated Oct. 26, 2018, 5 pages.
Search Report for German Patent Application No. 102015014478.2, dated Jul. 18, 2016, 8 pages.
El Salloum "Seamless Integration of Test Information Management and Calibration Data Management in the Overall Automotive Development Process," 2015 IEEE 8th International Conference on Software Testing, Verification and Validation (CST), IEEE, Apr. 13, 2015, 3 pages.
Herzog et al. "Kalibrierdatenverwaltung: Ein Puzzlespiel?" Automobil Elektronik E/E-Entwicklung fur Entscheider, Jun. 3, 2015, pp. 62-65 [retrieved online from: www.automobil-elektronik.de/wp-content/uploads/sites/7/2015/06/AEL_5-6_2015_Internet.pdf].
Jankov "Beitrag zur automatisierten Steuerkennfeld-Applikation bei Fahrzeug-Dieselmotoren," Technischen Universitat Berlin, Jul. 31, 2008, 178 pages [retrieved online from: opus.kobv.de/tuberlin/volltexte/2008/1972/pdf/jankov_kristian.pdf].
Platner et al. "Modellbasierte Serien-Kalibrierung-der Effiziente Weg Fur Variantenentwicklung," MTZ, Oct. 1, 2013, No. Oct. 2013, pp. 754-760.
Translation of the International Preliminary Report on Patentability for International (PCT) Patent Application No. PCT/EP2016/077365, dated May 24, 2018, 8 pages.

* cited by examiner

| | Variant 1 | Variant 2 | Variant 3 | Variant 4 | Variant 5 | Variant 6 | Total clusters | Identified Relationship |
|---|---|---|---|---|---|---|---|---|
| Vehicle par. A (rated power) | 100 | 100 | 100 | 200 | 200 | 200 | | |
| Vehicle par. B (market) | EU | US | JP | EU | US | JP | | |
| Lambda control | 0 | 0 | 0 | 0 | 0 | 0 | 1 | Equivalent data for A or B |
| Logistics data | 1 | 2 | 3 | 4 | 5 | 6 | 6 | Individual |
| Scavenging | 1 | 1 | 1 | 2 | 2 | 2 | 2 | Vehicle parameter A |
| Cat. converter heating | 10 | 20 | 30 | 10 | 20 | 30 | 3 | Vehicle parameter B |
| Tank leak diagnosis | 10 | 20 | 10 | 10 | 20 | 10 | 2 | Vehicle parameter B* |
| Cat. converter diagnosis | 10 | 20 | 30 | 20 | 40 | 60 | 5 | Vehicle parameter A&B |
| Pedal characteristics | 0 | 0 | 2 | 0 | 0 | 2 | 2 | Vehicle parameter B* |
| Sound suppression | 1 | 1,2 | 0,9 | 0,9 | 0,9 | 1 | 3 | Individual |

Control parameter

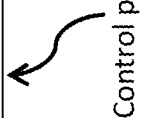

Fig. 2

|  | Variant 1 | Variant 2 | Variant 3 | Variant 4 | Variant 5 | Variant 6 | Calibration Function | Variant 7 | Variant 8 |
|---|---|---|---|---|---|---|---|---|---|
| Vehicle par. A (performance) | 100 | 100 | 100 | 200 | 200 | 200 | | 300 | 300 |
| Vehicle par. B (market) | EU | US | JP | EU | US | JP | | EU | US |
| Lambda control | 0 | 0 | 0 | 0 | 0 | 0 | Cntrl.par. 1 = f(A) or f(B) | 0 | 0 |
| Logistics data | 1 | 2 | 3 | 4 | 5 | 6 | - | ? | ? |
| Scavenging | 1 | 1 | 1 | 2 | 2 | 2 | Cntrl.par. 3 = f(A) | 3 | 3 |
| Cat.converter heating | 10 | 20 | 30 | 10 | 20 | 30 | Cntrl.par. 4 = f(B) | 10 | 20 |
| Tank leak diagnosis | 10 | 20 | 10 | 10 | 20 | 10 | Cntrl.par. 5 = f(B*) | 10 | 20 |
| Cat.converter diagnosis | 10 | 20 | 30 | 20 | 40 | 60 | Cntrl.par. 6 = f(A&B) | 40 | 80 |
| Pedal characteristics | 0 | 0 | 2 | 0 | 0 | 2 | Cntrl.par. 7 = f(B*) | 0 | 0 |
| Sound suppression | 1 | 1.2 | 0.9 | 0.9 | 0.9 | 1 | - | ? | ? |

Fig. 3

SYSTEM AND METHOD FOR CALIBRATING A VEHICLE COMPONENT

CROSS REFERENCE TO RELATED APPLICATIONS

This application is a national stage application under 35 U.S.C. 371 and claims the benefit of PCT Application No. PCT/EP2016/077365 having an international filing date of 10 Nov. 2016, which designated the United States, which PCT application claimed the benefit of German Patent Application No. 10 2015 014 478.2 filed 10 Nov. 2015, the disclosure of each of which are incorporated herein by reference.

The invention relates to a method and a system for calibrating a controller of a vehicle component, in particular at least one section of a drivetrain of a motor vehicle. Control data is thereby stored in the controller, on the basis of which the vehicle component is controlled.

One example of a vehicle component is the internal combustion engine of a motor vehicle. During the test and/or calibration phase (also called application phase) of such an internal combustion engine, its controller is provided with control data for various possible applications or operating states respectively and the most optimal possible configurations thereof determined in a common iterative process. Boundary conditions indicating target values for the operating parameters of the internal combustion engine are generally to be taken into account in this calibration process, e.g. emission, consumption, performance, etc.

The different vehicle components of a modern motor vehicle are usually operated via electronic controllers. In particular, the internal combustion engine is controlled using such controllers. The control of an electric motor, or an internal combustion engine in combination with an electric motor as well as a vehicle transmission in the case of hybrid drivetrains, is normally also accomplished by means of such electronic controllers.

In order for the respective electronic controllers to control these vehicle components, it is usually necessary for a plurality of control data relevant to the control of the respective vehicle components to be stored in a memory of the controller. For example, such control data could provide a shifting strategy for controlling a manual or automatic transmission. Such control data also generally encompasses control commands which are transmitted to the vehicle component(s) controlled by the respective electronic controller.

In the case of an internal combustion engine, the injectors of the internal combustion engine, for example, can be controlled by such control commands in terms of the amount of fuel to be injected into the combustion chamber of the internal combustion engine as well as the point in time at which the fuel is to be injected. The amount of fuel and the fuel injection point are thereby control parameters of the internal combustion engine.

The invention will be described in the following in relation to a drivetrain or internal combustion engine respectively. The invention is however also applicable to all other vehicle components operated by means of a controller.

When calibrating a controller used in a motor vehicle for controlling a drivetrain or the internal combustion engine respectively, an initial data populating of the controller based on estimates is generally first performed. Specifications intended to produce vehicle component target responses are thereby correlated with input-side control data which is to result in the corresponding actual responses.

One specification which is to result in a desired target response of an internal combustion engine is, for example, an accelerator pedal position taking into account the internal combustion engine's current rotational speed. The motor vehicle response in this case is usually an acceleration, in particular with a shifting operation.

Estimations and the resultant control data/control functions related to the control parameters drawn on for so-called initial data populating of a controller; i.e. an initial supplying of control data to the controller of a newly developed internal combustion engine, are thereby generally based on the empirical values of experienced test engineers tasked with calibrating an internal combustion engine and/or on calculation models related to the newly developed internal combustion engine.

Thus, the initial data population depends on the subjective assessment of the test engineer(s), in particular how they assess the effects of a design change on the internal combustion engine or boundary conditions, e.g. emission limit values, consumption limit values, etc., in relation to already known internal combustion engine calibrations.

WO 2013/131836 A3 relates to a method for optimizing internal combustion engines, in particular optimizing emissions and/or consumption, in which at least one of the secondary influencing variables is set as applicable at each operating point in their control units via correction functions such that the emission limit values are met in a defined cycle of operating points.

DE 10 2011 116 730 A1 relates to a method for data populating a control device for controlling a drive system of a road vehicle having the steps: initially populating the control device based on functions and/or estimations in which input-side specifications which are to result in target motor vehicle responses are associated with output-side control signals which are to lead to actual motor vehicle responses; and final data populating of the control device based on road test measurements of the actual responses of the motor vehicle subject to the specifications and compared to the target responses, whereby in the case of an allowable target/actual deviation, the associated control signals are corrected such that the target/actual deviation is eliminated or permitted.

DE 10 2013 003 493 A1 relates to a method for data populating a control device of a motor vehicle comprising the following steps: initially populating the control device using a first control device data set for the controlling of the control device; recording operating data in the control device or conducting road tests with the motor vehicle and the control device installed therein, wherein the control device is operated using the first control device data set; repopulating the control device with a second control device data set which at least partially differs from the first control device data set; simulating road tests in the control device without using the motor vehicle with the recorded operating data, whereby the control device is operated using the second control device data set.

Taking this prior art into consideration, one task of the invention is that of simplifying the calibration of a vehicle component or a controller of the vehicle component respectively. Particularly a task of the invention is that of objectifying the initial data populating of a vehicle component during calibration; i.e. defining it as generally as possible preferably as independently as possible from the estimation of a test engineer.

This task is solved by a method for calibrating a controller of a vehicle component according to claim 1 as well as a system for calibrating a controller of a vehicle component according to claim 15. Advantageous embodiments are claimed in the subclaims. The wording of the claims is herewith made part of the content of the description.

A first aspect of the invention relates to a method for calibrating a controller of a vehicle component, in particular at least one section of a drivetrain of a motor vehicle, wherein control data, on the basis of which the vehicle component is controlled, is stored in the controller, and wherein the method preferably comprises the following working steps:

identifying at least one first vehicle parameter of a plurality of vehicle parameters of calibrated variants of the vehicle component which differs for different calibrated variants;

if the calibrated variants differ in terms of the at least one first vehicle parameter, checking at least one portion of the control data of the calibrated variants for a relationship with the at least one identified vehicle parameter;

if a relationship is detected, defining a calibration function for the at least one portion of the control data on the basis of the relationship with the identified vehicle parameter;

determining control data of a variant of the vehicle component to be calibrated on the basis of the calibration function; and outputting the determined control data.

A vehicle component in the sense of the invention is an apparatus which can be installed in a vehicle. In particular, the vehicle component according to the invention is a section of a motor vehicle's drivetrain or the drivetrain as a whole. Preferably, the vehicle component is an internal combustion engine, an electric motor and/or the transmission of the motor vehicle.

A controller in the sense of the invention is an open or closed control and serves in the operation of a vehicle component. In closed control, actual operating parameter values of the vehicle component's operating states are again entered into a control parameter setting as input parameters based on the control data. The controller is preferably part of a vehicle component's control device but can, however, also be implemented in another control device as software or hardware.

Control data in the sense of the invention comprises an assignment rule between specifications and/or control input parameters and the individual control parameters for controlling the vehicle component. Preferably, additionally to the specification or input parameter respectively, the value of the control parameters in closed control depends on at least one operating parameter of the vehicle com-ponent. Preferably, the control data is stored in a table or as a control function, whereby an input parameter value is assigned a control parameter value.

A vehicle parameter in the sense of the invention is a characterizing property of the vehicle or the vehicle component, in particular a property, a characteristic or even a typification. Preferably, a vehicle or a vehicle component has a plurality of different vehicle parameters which characterize the vehicle or the vehicle component.

A plurality in the sense of the invention is at least two.

A variant of the vehicle component in the sense of the invention is an implementation of a specific vehicle component which differs from other variants or respectively implementations by the changing of at least one vehicle parameter, in particular a structural characteristic or a boundary condition such as, for example, the rated power.

One variant is preferably a derivative of the vehicle component. In particular, all of the vehicle component variants/derivatives are based on one and the same basic configuration.

A relationship in the sense of the invention is a correlation between two parameters. In particular, a relationship incorporates an association correlating the value of a first parameter with a value of a second parameter. Such a relationship can in particular be expressed as a function.

A calibration function in the sense of the invention is an assignment rule which associates at least a portion of the control data with a value based on the value of at least one vehicle parameter.

A vehicle in the sense of the invention is any type of land, water, air or spacecraft. A motor vehicle in the sense of the invention is a mechanically operated vehicle, in particular a passenger car, truck, motorcycle, motorboat, etc.

The invention is in particular based on the realization that most of the control data is the same across variants of the same vehicle component as installed in each case in vehicles for different markets or types of motor vehicles. That is to say that the values of one or more control parameters for input parameter values are the same among the variants or only vary on the basis of a relatively simple relationship relative the properties of the variants. The inventive method enables determining such relationships between the vehicle parameters characterizing the properties of the variants and the vehicle component control data in existing already calibrated variants. These relationships are subsequently used to establish a calibration function or calibration rule respectively with which a portion of the control data; i.e. a portion of the control parameters of the vehicle component can be initially populated.

In the case of a modern internal combustion engine, which comprises a plurality of control parameters, most of the control data of the controller can thereby be initially populated such that a new variant of the internal combustion engine can be stably operated.

In particular, due to the high number of control and operating parameters, modern internal combustion engines are of high complexity, with all of the many interdependencies being very difficult for one person to grasp. The inventive method thereby offers a person the possibility of discerning the relationships between the individual parameters.

An initial data populating performed according to the invention can replace or correct an initial populating performed by experienced test engineers. An initial populating of new variants of the internal combustion engine can therefore be performed by less experienced engineers or even by a technician on the basis of already calibrated variants. This can thus reduce the working time of highly-qualified specialists. Doing so on the one hand increases productivity in the course of internal combustion engine development and, on the other hand, lowers costs. The initial data population is furthermore decoupled from the assessment of a test engineer; i.e. becomes independent of subjective human observations, which often lead to improper data populating.

In particular given the widespread platform technology in the vehicle industry, in which individual platform models comprise different variants/derivatives of the respective vehicle components, working time and costs can be reduced during the development and calibration of vehicle components. Lastly, the relatively high informative value of the initial data population achieved with the inventive calibration method enables reducing valuable testing time during the vehicle component calibration and in the case of internal combustion engines, can even prevent irreversible damage to the prototype due to improper initial test engineer data population.

The inventive method for calibrating the controller of a vehicle component can thus substantially be divided into two parts: In a first part, a universally valid calibration function is determined for all variants of the vehicle component on the basis of already calibrated variants. In a second step, the calibration function is used to determine control data for one vehicle component variant to be calibrated.

A substantial difference of the invention relative to the prior art lies in no fixed predefined rules needing to be applied to the automated calibrating or data populating of vehicle component controllers. The invention instead follows a so-called data mining approach, wherein calibration functions are flexibly generated and tailored to each application, in particular for the same vehicle component of different vehicles. This is in particular advantageous since there are sometimes several thousand vehicle or vehicle platform variants nowadays which differ in terms of their respective properties or attributes and require data population. This is also of advantage in so-called variant management since the invention enables identifying which variant control data needs to be changed when changes are made in other variants.

A second aspect of the invention relates to a method for calibrating a controller of a vehicle component, in particular at least one section of a motor vehicle drivetrain, wherein control data, on the basis of which the vehicle component is controlled, is stored in the controller, and wherein the method preferably comprises the following working steps:

identifying at least one first vehicle parameter of a plurality of vehicle parameters of calibrated variants of the vehicle component which differs for different calibrated variants;

if the calibrated variants differ in terms of the at least one first vehicle parameter, checking at least one portion of the control data of the calibrated variants for a relationship with the at least one first identified vehicle parameter;

if a relationship is detected, defining a calibration function for the at least one portion of the control data on the basis of the relationship with the identified vehicle parameter; and outputting the calibration function.

In one advantageous embodiment of the calibration method, in particular according to the first or second aspect of the invention, when checking for a relationship between the at least one portion of the control data and the at least one first vehicle parameter, the same respective control parameter values of the control data of differently calibrated variants are assigned to a cluster, wherein the relationship with the at least one first vehicle parameter is checked on the basis of the cluster. Clustering enables existing relationships, in particular equivalent data populations, to be more easily identified.

A third aspect of the invention relates to a method for calibrating a controller of a vehicle component, in particular at least one section of a motor vehicle drivetrain, wherein control data, on the basis of which the vehicle component is controlled, is stored in the controller, whereby there are multiple variants of the vehicle component differing by at least one vehicle parameter, and wherein the method preferably comprises the following working steps:

determining control data of a variant of the vehicle component to be calibrated on the basis of a calibration function between the control function and the at least one vehicle parameter, wherein the calibration function is based on a relationship between at least one portion of the control data of a plurality of already calibrated variants of the vehicle component and the at least one vehicle parameter; and outputting the determined control data.

In one advantageous embodiment, the calibration method, in particular according to the first or third aspect of the invention, further comprises the working step of populating the controller of the variant of the vehicle component to be calibrated with the calibration function and/or the control data as determined.

A fourth aspect of the invention relates to a method for calibrating a controller of a vehicle component, in particular at least one section of a motor vehicle drivetrain, wherein control data, on the basis of which the vehicle component is controlled, is stored in the controller, and wherein the method comprises the following working steps:

identifying at least one first vehicle parameter from a plurality of variants populated with the vehicle component's vehicle parameters, wherein the first vehicle parameter differs for the populated variants;

if the populated variants differ in terms of the at least one first vehicle parameter, checking at least one portion of the control data of the populated variants for a relationship with the at least one identified vehicle parameter;

if a relationship is detected, defining a calibration function for the at least one portion of the control data on the basis of the relationship with the identified vehicle parameter;

checking the control data of a previously populated variant of the vehicle component to be calibrated on the basis of the calibration function; and if the checked control data deviates from the calibration function, outputting notification of said deviation.

Determinable in this alternative embodiment of the inventive method are deviations, in particular manually populated variants of vehicle components. The components already populated are thereby analyzed and assessed for possible relationships. If, for example, only one variant deviates from a possible relationship, this deviation is then classified as an error, in particular as an input error by the test engineer, and preferably also output. This alternative of the inventive method enables newly created control data to be validated and undesired data differences prevented or necessary differences controlled. In particular, problems in operating an internal combustion engine with an initial data population can be avoided.

The following will describe advantageous embodiments of the inventive method which, unless expressly excluded, can in each case be combined with all aspects of the invention and with each other.

In one advantageous embodiment, no calibration function is provided for that portion of the control data not having any detected relationship to at least one vehicle parameter.

This other portion of the control data is thus to be preferably manually populated by the respective test engineers. Depending upon the control parameter, automated populating could cause damage to the vehicle component.

In a further advantageous embodiment, different control parameters can have different calibration functions in relation to the at least one vehicle parameter and/or different calibration functions in relation to respective different vehicle parameters.

This thereby ensures that the largest possible part of the control data can be automatically populated.

In a further advantageous embodiment, the inventive method, in particular according to the fourth aspect of the invention, comprises the further working step of correcting the deviation of the checked control data from the calibration function in the controller of the variant to be calibrated.

In a further advantageous embodiment, the inventive method further comprises the following working steps:
- conducting at least one test bench trial with the populated vehicle component to be calibrated or at least one test with a vehicle having the populated vehicle component to be calibrated;
- comparing actual values of the vehicle component operating parameters to target values; and
- repopulating the controller of the vehicle component to be calibrated on the basis of deviations between the actual values and the target values of the vehicle component operating parameter.

A full calibration of a vehicle component is preferably only possible through further test bench trials with the vehicle component or by actual operating tests within vehicles. Alternatively or additionally, simulation tests can also be performed, for example by HIL (Hardware-in-the-Loop) testing. The inventive method can substantially shorten such tests on a new vehicle component to be calibrated.

In a further advantageous embodiment of the inventive method, the vehicle component is an internal combustion engine and the at least one vehicle parameter is selected from among the following group: rated power, market specification, emission, consumption, drivability and vehicle type.

In a further advantageous embodiment of the inventive method, the vehicle component is preferably an internal combustion engine and the control data relates to at least one control parameter from among the following group: lambda control, logistics data, scavenging, catalytic converter heating, tank leak diagnosis, pedal characteristics, sound suppression, rpm, injection process start, droplet diameter, oxygen concentration, injecting duration, EGR rate, ignition delay and/or mass fraction burn point.

In a further advantageous embodiment of the inventive method, the relationship between the first vehicle parameter and the control data constitutes an equivalency of a control parameter of the control data for the same values or characteristics of at least one second vehicle parameter, a linear dependence of a control parameter of the control data on the at least one vehicle parameter for the same values or characteristics of at least one second vehicle parameter, a polynomial dependence of a control parameter of the control data on the at least one first vehicle parameter for the same values or characteristics of at least one second vehicle parameter and/or a statistical dependence of a control parameter of the control data on the at least one first vehicle parameter for the same values or characteristics of at least one second vehicle parameter.

In a further advantageous embodiment of the inventive method, the relationship between the at least one first control parameter and the control data applies to at least two groups of variants with the respective same values or characteristics of the at least one first vehicle parameter and respective different values or characteristics of the at least one second vehicle parameter, wherein compared to a second group, a first group exhibits different values or characteristics of the at least one first vehicle parameter and the same values or characteristics of the at least one second vehicle parameter. A group thereby comprises at least two variants.

The above-described features and associated advantages with respect to the aspects of an inventive method apply to the aspects of the inventive system described below and vice versa.

A fifth aspect of the invention relates to a system for calibrating a controller of a vehicle component, in particular at least one section of the drivetrain. Preferably, control data is stored in the controller, on the basis of which the vehicle component is controlled. The system thereby preferably has a first interface for importing control data of a plurality of vehicle parameters of calibrated variants of the vehicle component and vehicle parameters of at least one variant to be calibrated. Furthermore, the system preferably comprises a processing unit configured to identify at least one first vehicle parameter, preferably a rated power, an emission value and/or a market specification, in particular EU, USA or JP, of a plurality of vehicle parameters of calibrated variants of the vehicle component, wherein the first vehicle parameter is different for different variants. Preferably, the processing unit is further configured to check at least a portion of the control data of the calibrated variants for a relationship with the at least one first vehicle parameter and to define a calibration function for at least a portion of the control data on the basis of the relationship with the first vehicle parameter. The processing unit is preferably furthermore configured to determine control data of a vehicle component variant to be calibrated on the basis of the calibration function. The system moreover preferably has a second interface for outputting the control data determined, in particular to the controller of the vehicle component.

In one advantageous embodiment of the system according to the invention for calibrating a controller of a vehicle component, the further interface is furthermore configured to write the control data to the controller.

The inventive system is preferably implemented on the basis of a conventional data processing device having suitable computing power and storage capacity. The inventive processing unit and the interfaces can thereby be implemented both as hardware as well as by software modules.

Further features, advantages and possible applications of the invention are yielded by the following description in conjunction with the figures.

Figure 4:
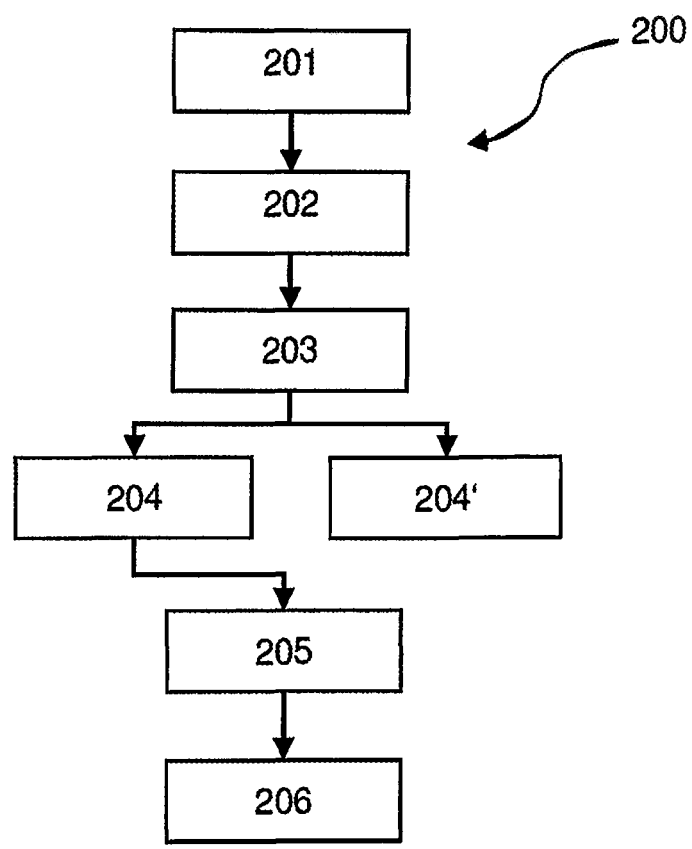
Figure 5:
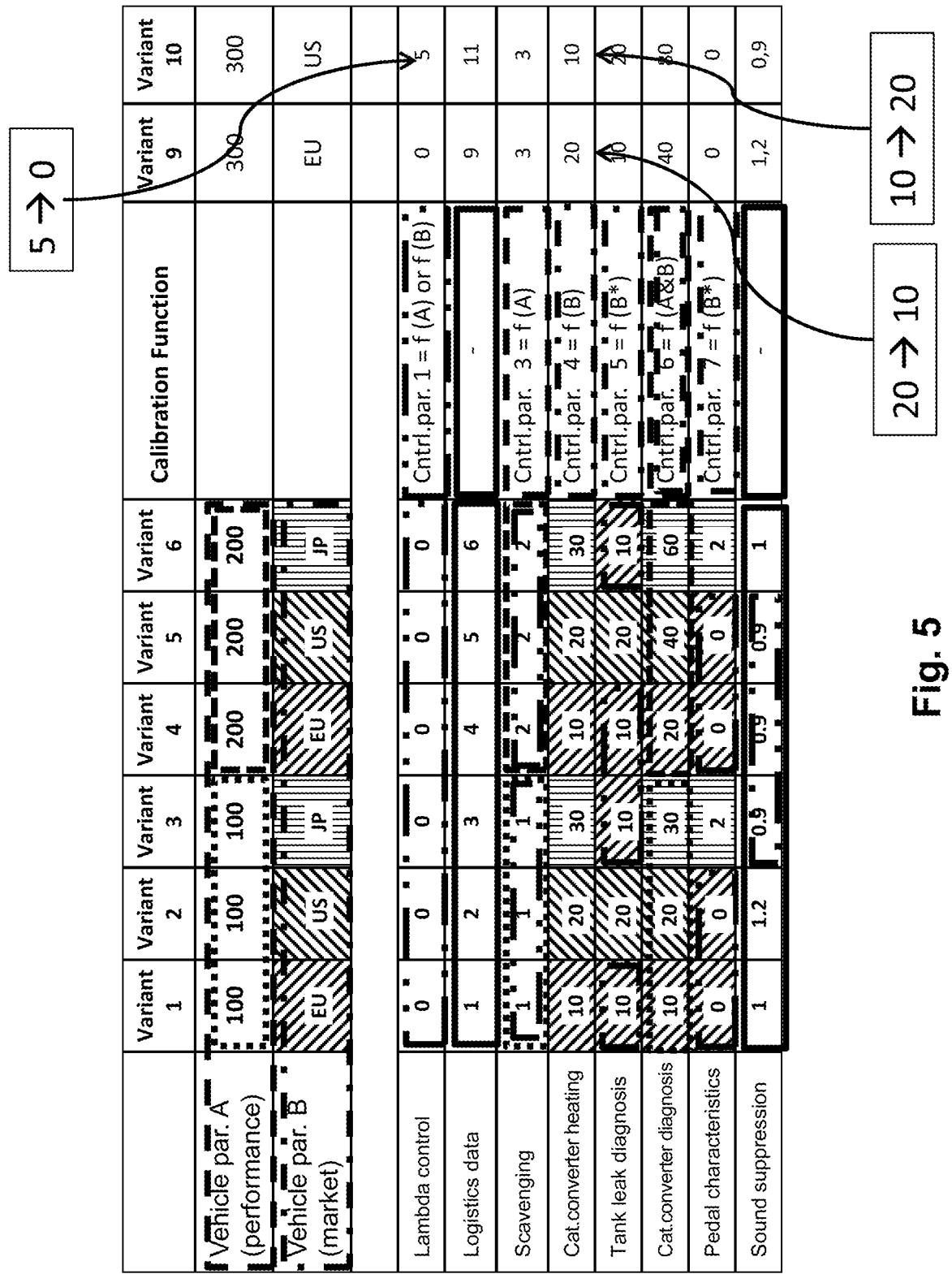

Shown at least partly schematically are:

FIG. 1 a block diagram of the method for calibrating a vehicle component according to the first aspect of the invention;

FIG. 2 an example data set of a project with six variants of a vehicle component;

FIG. 3 a table with the example data set from FIG. 2 as well as an initial data populating of further vehicle component variants of the project;

FIG. 4 a block diagram of a method for calibrating a controller of a vehicle component according to the fourth aspect of the invention; and FIG. 5 a table with the data set from FIG. 2 and two further vehicle component variants of the project which have already been calibrated, the data population of which is to be checked.

The following will reference FIG. 1 to FIG. 3 in describing an embodiment of the first to third aspect of the invention.

The inventive method 100, 200 will thereby be described by way of an example referencing an application for internal combustion engines. The invention is not, however, limited to this application and can be used for any other vehicle component.

FIG. 2 is a representation of a data set containing control data from six variants of a specific internal combustion engine project. This can thereby also be referred to as a so-called engine family. The individual variants of the project differ in variants 1 to 6 by the rated power and the market specification. These two properties, also called attributes, or respectively characteristics of the individual variants thus constitute the A and B vehicle parameters relative to variants 1 to 6. Depending on the rated power which the (motor) vehicle is to have and the market in which it is to be sold, the control data of the respective engine control system needs to be adapted to the individual internal combustion engine variant in order to satisfy the performance specifications and the legal requirements.

The calibration values of variants 1 to 6 are validated on a test bench or in a test run of a motor vehicle so that the individual variants are to be regarded as calibrated in terms of their respective actual control data.

The individual control parameters of the control data considered in this data set are the lambda control, the logistics data, the scavenging, the catalytic converter heating, the tank leak diagnosis, the catalytic converter diagnosis, the pedal characteristics and the sound suppression.

Even if the individual control parameter items are depicted in the table as individual numerical values in relation to the variants, they are usually characteristic diagrams indicating the dependency of the respective control parameter on a plurality of input parameters. For the sake of clarity, the present case depicts individual numerical values representative of potentially stored characteristic diagrams.

The number of vehicle parameters is not limited to the A and B vehicle parameters specified here and can comprise further vehicle parameters such as, for example, the consumption value, the emission value for different gases, the drivability rating or also the motor vehicle type and more. Nor are the control parameters limited to the control parameters specified in FIG. 2; further control parameters such as rpm, fuel injection process start, fuel droplet diameter, oxygen concentration, injecting duration, EGR rate, ignition delay, mass fraction burn and/or negative intake manifold pressure can for example be contained in the data set.

Those vehicle parameter(s) with values differing between the individual variants are first identified in the inventive method 101, 201. This is necessary since there can preferably only be a dependence of the control parameters between variants if they differ by at least one vehicle parameter. Since the variants are however preferably characterized by a set of different vehicle parameter values, they therefore must differ in one value of a vehicle parameter. One value hereby refers to a number or also a designation or identification.

A so-called clustering of the data set shown in FIG. 2 is thereupon made. In particular, those values of a control parameter which are the same or at least similar for different variants are identified. The number of clusters in FIG. 2 thereby corresponds to the number of items having different values for the respective control parameter. Translated into characteristic diagrams, these would be differently populated characteristic diagrams. For example, there are two clusters in FIG. 2 with respect to the tank leak diagnosis control parameter, whereby the first cluster comprises the dotted-framed values of 10 and the second cluster comprises values of 20. With respect to the catalytic converter diagnosis control parameter, there are five clusters in FIG. 2, whereby each item of a variant in the data field represents its own cluster except for the variant 2 and 4 items, which both exhibit value 20.

On the basis of these clusters, a check is made as to whether a relationship exists between control data of the data set of calibrated variants 1 to 6 and at least one of the rated power (A) or market specification (B) vehicle parameters 102, 202.

The following relationships, listed in the right column of the table, were identified from the data set depicted in FIG. 2: With respect to the control parameter of lambda control, all the variant values are the same, namely zero. There is thus a constant dependence on both the rated power (A) vehicle parameter and the market specification (B) vehicle parameter.

For the logistics data control parameter, neither a cluster nor pattern is identified based on which a relationship could be established between one of the vehicle parameters and the respective values in terms of the logistics data variants. There is thus an individual relationship between the logistics data and the vehicle parameters for each variant.

There are two clusters for the scavenging control parameter with respect to the six calibrated variants. Closer inspection reveals that the clustering corresponds exactly to the gradation of the rated power (A) vehicle parameter between the values of 100 and 200. There is thus a dependency of the scavenging control parameter on the rated power (A) vehicle parameter.

Three clusters are identified in FIG. 2 for the catalytic converter heating control parameter; one cluster with values of 10, one cluster with values of 20 and one cluster with values of 30. On closer analysis, it is evident that the clusters correspond exactly to the market specification (B) vehicle parameter. For the EU value of the market specification (B) vehicle parameter, the catalytic converter heating control parameter exhibits the value of 10 in each case, for the US value, the catalytic converter heating control parameter exhibits the value of 20 in each case, and for the JP value, the catalytic converter heating control parameter exhibits the value of 30 in each case. There is thus a relationship with the market specification (B) vehicle parameter.

Two clusters are identified with respect to the tank leak diagnosis control parameter. Upon closer analysis, it is evident that the values of the pattern yield a dependency on the market specification (B) vehicle parameter. Since the market specification (B) vehicle parameter only differs between the EP and JP values with the inclusion of the rated power (A) vehicle parameter, the dependency here is identified as B*.

The FIG. 2 clustering analysis with respect to the catalytic converter diagnosis control parameter yields five clusters, as previously described. On closer analysis, it becomes apparent that although there is a dependence of this control parameter, the dependency is however contingent upon both the rated power (A) vehicle parameter as well as the market specification (B) vehicle parameter. Thus, with the same market specification (B) vehicle parameter of different variants in this case, the values are in each case doubled when the rated power is increased by 100.

The analysis of the values of the pedal characteristics control parameter yields two clusters. Here as well, there is a dependence on the market specification (B) vehicle parameter, whereby the control parameter values can also only be clearly identified for the EU and US values here when including the (A) vehicle parameter. This likewise relates to a dependence B* on the market specification (B) vehicle parameter.

For the sound suppression control parameter, although there is a clustering of three clusters, no pattern was identified such that only an individual relationship between the individual values of the variants and the values of the control parameter exists.

The different types of identified relationships are depicted in FIG. 2 with differently dotted borders to the individual fields. A solid border means an individual relationship. The rated power (A) vehicle parameter dependencies are depicted by two differently dotted borders around the respective cluster, the market specification (B) vehicle parameter dependencies are depicted by different shadings to the fields. Data equivalency in terms of both A and B vehicle parameters is additionally identified by a separate double-dotted border.

On the basis of these relationships as identified, a calibration function can be defined for the at least one analyzed portion of the control data set of the calibrated variants 103, 203. Preferably no calibration function is generated for that portion of the control data not having any detected relationship. The control data in this other portion should preferably be manually completed by test engineers.

In FIG. 3, the respective calibration functions for the individual control parameters from lambda control to sound suppression are indicated, where applicable, in the Calibration Function column. These functions can preferably be consolidated into a common aggregate function. Any type of mathematical function is thereby possible, for example even Boolean functions or statistical functions which enable statistical information on the data set. The control parameter of lambda control is a constant function which, as defined by the invention, depends both on vehicle parameter A as well as vehicle parameter B.

As likewise shown in FIG. 3, control data from not yet calibrated variants of the internal combustion engine; i.e. variants still to be calibrated, can be determined using this calibration function or an aggregate calibration function 104, 204 respectively. In the present case, these are indicated in the two right columns as variant 7 and variant 8.

Alternatively, the calibration function can be output 104', 204', for example via an interface to another process.

Using the above-described identified relationship or the calibration functions based on same respectively enables initial data populating to be made as shown for the calibrating of variants 7 and 8. Only as regards the logistics data and sound suppression control parameters could no initial data population be made since no calibration function could be defined.

The control data of the initial data population can preferably also be output 105.

Preferably, the controller of the variant to be calibrated by means of the calibration function and/or the determined control data is populated in a further working step 106. In particular, the respective control data values of the individual control parameters are thereby written to a memory of the controller.

The internal combustion engine variants 7 and 8, which have been initially populated, preferably further undergo test operation on the test bench, in the actual vehicle or also on a HIL test bench. The initial data population can thereby be validated or refined respectively. Those control parameters for which no automatic initial data populating can be made for the inventive method should preferably be manually populated by a test engineer for the tests.

Described on the basis of FIG. 4 and FIG. 5 is one embodiment of the method 200 for calibrating a controller of a vehicle component corresponding to the fourth aspect of the invention.

Up to the defining of a calibration function or a plurality of calibration functions respectively, this embodiment of the method 200 substantially corresponds to the second aspect of the invention.

In contrast to the first and third aspect of the invention, however, after the defining of the calibration function or calibration functions as shown in FIG. 5, they are used to check the consistency of the previously calibrated internal combustion engine variants 9 and 10. The individual items are checked on the basis of the detected control function and deviations from the control functions can be determined 204. If such a deviation is determined, it is preferably output, particularly as an indication of the deviation 205.

In a subsequent working step, the deviation can then be corrected in correspondence with the respective calibration function 206. Thus, identified for example in FIG. 5 with respect to the control parameter of the lambda control in variant 10 is that instead of the value 0 yielded by the calibration function, the value of 5 is set or respectively stored. This value is to be changed in the correction working step. In the case of the catalytic converter heating control parameter, it was determined that the values of 20 and 10 were transposed between variants 9 and 10. They are therefore each to be changed in a subsequent correction working step.

Preferably, the determination of the calibration function can be carried over to a plurality of internal combustion engine projects. An internal combustion engine project in each case thereby comprises a plurality of variants or respectively derivatives of a basic embodiment of an internal combustion engine. The data sets shown in FIGS. 2, 3 and 5 would thereby each correspond to a respective project. A calibration function detected on the basis of one or more of these projects can thereby be validated in terms of all the projects. If the calibration function applies to all the projects, it can then be classified as "reliable." If it applies to only some of the projects, it can be classified as "conditionally reliable." If a calibration function applies to all previous projects, a so-called reliable or initial data population of the newly developed internal combustion engine can be made in a new project or when developing further variants of an existing project. If, however, it is only a "conditionally reliable" calibration function, only one prepopulating can be made which still needs to be subsequently checked/validated. The "reliable" and "conditionally reliable" rankings can thereby also be rendered in more concrete terms by specifying percentages or probabilities of the respective calibration function or aggregate calibration function reliability.

This enables the percentage of individual equivalently populated variants/projects to be further increased and thus the efforts involved in calibration further reduced.

"Modern development platform for vehicle drive calibration"
STORYLINE – MAIN BODY METHODOLOGY 2.0

- <u>Identifying patterns in calibration data and deriving data population rules</u>
  - Motivation
    - Preventing undesired data differences between variants
    - Controlling necessary differences between derivatives
    - Deriving initial data populations/derivative data populations from data statistics

- Principle
    - Clustering of data differences by variant attributes
      - at work package level
      - at functional level
      - at label level

- Application
    - Project/engine family analysis
      - Deriving attribute cluster templates
    - Analysis results comparison on multiple projects
      - Deriving data population rules "Modern development platform for vehicle drive calibration"
STORYLINE – MAIN BODY METHODOLOGY 2.0

- Identifying patterns in calibration data and deriving data population rules
  - Motivation
    - Preventing undesired data differences between variants
    - Controlling necessary differences between derivatives
    - Principle
      - Clustering of data differences by variant attributes
        - at work package level
        - at functional level
        - at label level
  - Application
    - Deriving "templates" for initial data populations/ derivative data populations from data statistics "Modern development platform for vehicle drive calibration"
CLUSTERING OF DATA DIFFERENCES BY ATTRIBUTES

- Principle: Clustering of data differences by attributes
  - Consideration of all data sets of a project

|  | DS 1 | DS 2 | DS 3 | DS 4 | DS 5 | DS 6 | DS 7 | DS 8 | DS n |
|---|---|---|---|---|---|---|---|---|---|
| Variable 1 | 1.856 | 33.09 | 5.584 | 2694 | 550.6 | 4356 | 4.492 | 6583 | 5678 |
| Variable 2 | 1.001 | 1.001 | 1.001 | 1.001 | 1.001 | 1.011 | 1.001 | 1.001 | 1.001 |
| Variable 3 | 101 | 101 | 101 | 102 | 102 | 102 | 103 | 103 | 103 |
| Variable 4 | 2.12 | 2.22 | 2.12 | 2.12 | 2.22 | 2.12 | 2.12 | 2.22 | 2.12 |
| Variable 5 | 1.001 | 1.011 | 1.111 | 1.001 | 1.001 | 1.111 | 1.001 | 1.011 | 1.111 |
| Variable 6 | 12 | 12 | 12 | 12 | 12 | 12 | 12 | 12 | 12 |
| Variable 7 | 0.101 | 0.101 | 0.101 | 0.101 | 0.101 | 0.101 | 0.111 | 0.111 | 0.111 |
| Variable n | 1287 | 1030 | 1030 | 1031 | 1378 | 1376 | 1378 | 1256 | 1287 |

"Modern development platform for vehicle drive calibration"
CLUSTERING OF DATA DIFFERENCES BY ATTRIBUTES

- Principle: Clustering of data differences by attributes
  - Linking the attributes to the value clusters of different data set variables (labels, functions, work packages)

|  | DS 1 | DS 2 | DS 3 | DS 4 | DS 5 | DS 6 | DS 7 | DS 8 | DS n |
|---|---|---|---|---|---|---|---|---|---|
| Attribute A "rated power" | 100 | 100 | 100 | 200 | 200 | 200 | 300 | 300 | 300 |
| Attribute B "country variant" | EU | USA | China | EU | USA | China | EU | USA | China |
| Variable 1 | 1.856 | 33.09 | 5.584 | 2694 | 550.6 | 4356 | 4.492 | 6583 | 5678 |
| Variable 2 | 1.001 | 1.001 | 1.001 | 1.001 | 1.001 | 1.011 | 1.001 | 1.001 | 1.001 |
| Variable 3 | 101 | 101 | 101 | 102 | 102 | 102 | 103 | 103 | 103 |
| Variable 4 | 2.12 | 2.22 | 2.12 | 2.12 | 2.22 | 2.12 | 2.12 | 2.22 | 2.12 |
| Variable 5 | 1,.01 | 1.011 | 1.111 | 1.001 | 1.001 | 1.111 | 1.001 | 1.011 | 1.111 |
| Variable 6 | 12 | 12 | 12 | 12 | 12 | 12 | 12 | 12 | 12 |
| Variable 7 | 0.101 | 0.101 | 0.101 | 0.101 | 0.101 | 0.101 | 0.111 | 0.111 | 0.111 |
| Variable n | 1287 | 1030 | 1030 | 1031 | 1378 | 1376 | 1378 | 1256 | 1287 |

"Modern development platform for vehicle drive calibration"
CLUSTERING OF DATA DIFFERENCES BY ATTRIBUTES

- Example: "Template" creation and application
  - Validating newly generated data

|  | DS 1 | DS 2 | DS 3 | DS 4 | DS 5 | DS 6 | DS 7 | DS 8 | DS n |
|---|---|---|---|---|---|---|---|---|---|
| Attribute A "rated power" | 100 | 100 | 100 | 200 | 200 | 200 | 300 | 300 | 300 |
| Attribute B "country variant" | EU | USA | China | EU | USA | China | EU | USA | China |
| Variable 1 | Equivalent data population | | | | | | | | |
| Variable 2 | 1.001 | 1.001 | 1.001 | 1.001 | 1.001 | 1.011 | 1.001 | 1.001 | 1.001 |
| Variable 3 | | | | | | | | | |
| Variable 4 | 2.12 | | 2.12 | 2.12 | | 2.12 | 2.12 | | 2.12 |
| Variable 5 | 1.001 | | | 1.001 | | | 1.001 | | |
| Variable 6 | 12 | 12 | 12 | 12 | 12 | 12 | 12 | 12 | 12 |
| Variable 7 | 0.101 | 0.101 | 0.101 | 0.101 | 0.101 | 0.101 | | | |
| Variable n | | | | | | | | | |

"Modern development platform for vehicle drive calibration"
CLUSTERING OF DATA DIFFERENCES BY ATTRIBUTES

- Example: "Template" creation and application
  - Validating newly generated data

| | DS 1 | DS 2 | DS 3 | DS 4 | DS 5 | DS 6 | DS 7 | DS 8 | DS n |
|---|---|---|---|---|---|---|---|---|---|
| Attribute A "rated power" | 100 | 100 | 100 | 200 | 200 | 200 | 300 | 300 | 300 |
| Attribute B "country variant" | EU | USA | China | EU | USA | China | EU | USA | China |
| Variable 1 | Equivalent data population | | | | | | | | |
| Variable 2 | 1.001 | 1.001 | 1.001 | 1.001 | 1.001 | 1.011 | 1.001 | 1.001 | 1.001 |
| Variable 3 | | | | | | | | | |
| Variable 4 | 2.12 | | 2.12 | 2.12 | | 2.12 | 2.12 | | 2.12 |
| Variable 5 | 1.001 | | | 1.001 | | | 1.001 | | |
| Variable 6 | 12 | 12 | 12 | 12 | 12 | 12 | 12 | 12 | 12 |
| Variable 7 | 0.101 | 0.101 | 0.101 | 0.101 | 0.101 | 0.101 | | | |
| Variable n | | | | | | | | | |

"Modern development platform for vehicle drive calibration"
CLUSTERING OF DATA DIFFERENCES BY ATTRIBUTES

- Example: "Template" creation and application
  - Validating newly generated data

| | DS 1 | DS 2 | DS 3 | DS 4 | DS 5 | DS 6 | DS 7 | DS 8 | DS n |
|---|---|---|---|---|---|---|---|---|---|
| Attribute A "rated power" | 100 | 100 | 100 | 200 | 200 | 200 | 300 | 300 | 300 |
| Attribute B "country variant" | EU | USA | China | EU | USA | China | EU | USA | China |
| | | | | Attribute A | | | | | |
| Variable 1 | | | | | | | | | |
| Variable 2 | | | | | | | | | |
| Variable 3 | 101 | 101 | 101 | 102 | 102 | 102 | 103 | 103 | 103 |
| Variable 4 | | | | | | | | | |
| Variable 5 | | | | | | | | | |
| Variable 6 | | | | | | | | | |
| Variable 7 | | | | | | | 0.111 | 0.111 | 0.111 |
| Variable n | | | | | | | | | |

"Modern development platform for vehicle drive calibration"
CLUSTERING OF DATA DIFFERENCES BY ATTRIBUTES

- Example: "Template" creation and application
  - Validating newly generated data

| | DS 1 | DS 2 | DS 3 | DS 4 | DS 5 | DS 6 | DS 7 | DS 8 | DS n |
|---|---|---|---|---|---|---|---|---|---|
| Attribute A "rated power" | 100 | 100 | 100 | 200 | 200 | 200 | 300 | 300 | 300 |
| Attribute B "country variant" | EU | USA | China | EU | USA | China | EU | USA | China |
| | | | | | Attribute A | | | | |
| Variable 1 | | | | | | | | | |
| Variable 2 | | | | | | | | | |
| Variable 3 | 101 | 101 | 101 | 102 | 102 | 102 | 103 | 103 | 103 |
| Variable 4 | | | | | | | | | |
| Variable 5 | | | | | | | | | |
| Variable 6 | | | | | | | | | |
| Variable 7 | | | | | | | 0.111 | 0.111 | 0.111 |
| Variable n | | | | | | | | | |

"Modern development platform for vehicle drive calibration"
CLUSTERING OF DATA DIFFERENCES BY ATTRIBUTES

- Example: "Template" creation and application
  - Validating newly generated data

| | DS 1 | DS 2 | DS 3 | DS 4 | DS 5 | DS 6 | DS 7 | DS 8 | DS n |
|---|---|---|---|---|---|---|---|---|---|
| Attribute A "rated power" | 100 | 100 | 100 | 200 | 200 | 200 | 300 | 300 | 300 |
| Attribute B "country variant" | EU | USA | China | EU | USA | China | EU | USA | China |
| | | | | | | | | Attribute B | |
| Variable 1 | | | | | | | | | |
| Variable 2 | | | | | | | | | |
| Variable 3 | | | | | | | | | |
| Variable 4 | | 2.22 | | | 2.22 | | | 2.22 | |
| Variable 5 | | 1.011 | 1.111 | | 1.001 | 1.111 | | 1.011 | 1.111 |
| Variable 6 | | | | | | | | | |
| Variable 7 | | | | | | | | | |
| Variable n | | | | | | | | | |

"Modern development platform for vehicle drive calibration"
CLUSTERING OF DATA DIFFERENCES BY ATTRIBUTES

- Example: "Template" creation and application
  - Validating newly generated data

|  | DS 1 | DS 2 | DS 3 | DS 4 | DS 5 | DS 6 | DS 7 | DS 8 | DS n |
|---|---|---|---|---|---|---|---|---|---|
| Attribute A "rated power" | 100 | 100 | 100 | 200 | 200 | 200 | 300 | 300 | 300 |
| Attribute B "country variant" | EU | USA | China | EU | USA | China | EU | USA | China |
|  |  |  |  |  |  |  |  | Attribute B | |
| Variable 1 |  |  |  |  |  |  |  |  |  |
| Variable 2 |  |  |  |  |  |  |  |  |  |
| Variable 3 |  |  |  |  |  |  |  |  |  |
| Variable 4 |  | 2.22 |  |  | 2.22 |  |  | 2.22 |  |
| Variable 5 |  | 1.011 | 1.111 |  | 1.001 | 1.111 |  | 1.011 | 1.111 |
| Variable 6 |  |  |  |  |  |  |  |  |  |
| Variable 7 |  |  |  |  |  |  |  |  |  |
| Variable n |  |  |  |  |  |  |  |  |  |

- <u>Identifying patterns in calibration data and deriving data population rules</u>
  - Motivation
    - Preventing unwanted data differences between variants
    - Controlling necessary differences between derivatives
    - Deriving initial data populations/derivative data populations from data statistics
          - Principle
            - Clustering of data differences by variant attributes
              - at work package level
              - at functional level
              - at label level
  - Application
    - Project/engine family analysis
      - Deriving attribute cluster templates
    - Analysis results comparison on multiple projects
      - Deriving data population rules

CLUSTERING OF DATA DIFFERENCES BY ATTRIBUTES

- Principle: Clustering of data differences by attributes
  - Linking the attributes to the value clusters of different variables (labels, fuctions, work packages) of different data sets

|  | Drv1 | Drv2 | Drv3 | Drv4 | Drv5 | Drv6 | Total clusters |
|---|---|---|---|---|---|---|---|
| Attribute A "rated power" | 100 | 100 | 100 | 200 | 200 | 200 | |
| Attribute B "country variant" | E | U | C | E | U | C | |
| Variable 1 | 0 | 0 | 0 | 0 | 0 | 0 | 1 |
| Variable 2 | 1 | 2 | 3 | 4 | 5 | 6 | 6 |
| Variable 3 | 1 | 1 | 1 | 2 | 2 | 2 | 2 |
| Variable 4 | 10 | 20 | 30 | 10 | 20 | 30 | 3 |
| Variable 5 | 10 | 20 | 10 | 10 | 20 | 10 | 2 |
| Variable 6 | 10 | 20 | 30 | 20 | 40 | 60 | 5 |
| Variable 7 | 0 | 2 | 0 | 0 | 0 | 2 | 2 |
| Variable 8 | 1 | 1.2 | 0.9 | 0.9 | 0.9 | 1 | 3 |

CLUSTERING OF DATA DIFFERENCES BY ATTRIBUTES

- Technical examples:
  - A derivative is a calibration data set of an electronic vehicle control unit
    - engine control unit, transmission control module, hybrid controller, door control unit...
  - Derivative examples:
    - x vehicle variants with identical engines
    - y performance variants with identical transmissions

- Variables can be further subdivided in any exact or rough manner
    - Exact: "Label" = individual variable of xCU e.g.:
      - load/speed ignition angle characteristic with minimum valve overlap and low valve lift
      - Exhaust gas temperature threshold for overrun fuel cut-off limitation

- Medial: "Function" = xCU manufacturer-based label groupings, e.g.
      - basic ignition angle development
      - desired driver torque development

- Rough: "Work package" = user-based function/label groupings, e.g.
      - emission application
      - shift performance

CLUSTERING OF DATA DIFFERENCES BY ATTRIBUTES

- Technical examples:
  - Derivate = 2 performance levels with 3 country variants in the same vehicle & transmission
  - Variable = functional level yes = <u>all</u> attribute values different
yes* = <u>individual</u> attribute values different

| | Drv1 | Drv2 | Drv3 | Drv4 | Drv5 | Drv6 | Total clusters | Attribute A dependent | Attribute B dependent | Cluster valuation |
|---|---|---|---|---|---|---|---|---|---|---|
| Attribute A "rated power" | 100 | 100 | 100 | 200 | 200 | 200 | | | | |
| Attribute B "country variant" | EU | USA | China | EU | USA | China | | | | |
| Lambda control | 0 | 0 | 0 | 0 | 0 | 0 | 1 | no | no | equiv. data |
| Logistics data | 1 | 2 | 3 | 4 | 5 | 6 | 6 | no | no | individual |
| Scavenging | 1 | 1 | 1 | 2 | 2 | 2 | 2 | yes | no | Attribute A |
| CC heating | 10 | 20 | 30 | 10 | 20 | 30 | 3 | no | tes | Attribute B |
| Tank leak diagnosis | 10 | 20 | 10 | 10 | 20 | 10 | 2 | no | yes* | Attribute B* |
| CC diagnosis | 10 | 20 | 30 | 20 | 40 | 60 | 5 | no | no | unknown |
| Pedal characteristics | 0 | 2 | 0 | 0 | 0 | 2 | 2 | no | no | unknown |
| Sound suppression | 1 | 1.2 | 0.9 | 0.9 | 0.9 | 1 | 3 | no | no | unknown |

CLUSTERING OF DATA DIFFERENCES BY ATTRIBUTES

- Principle: Clustering of data differences by attributes
  - Linking the attributes to the value clusters of different variables (labels, fuctions, work packages) of different data sets yes = <u>all</u> attribute values different
yes* = <u>individual</u> attribute values different

| | Drv1 | Drv2 | Drv3 | Drv4 | Drv5 | Drv6 | Total clusters | Attribute A dependent | Attribute B dependent | Cluster valuation |
|---|---|---|---|---|---|---|---|---|---|---|
| Attribute A "rated power" | 100 | 100 | 100 | 200 | 200 | 200 | | | | |
| Attribute B "country variant" | E | U | C | E | U | C | | | | |
| Variable 1 | 0 | 0 | 0 | 0 | 0 | 0 | 1 | no | no | equiv. data |
| Variable 2 | 1 | 2 | 3 | 4 | 5 | 6 | 6 | no | no | individual |
| Variable 3 | 1 | 1 | 1 | 2 | 2 | 2 | 2 | yes | no | Attribute A |
| Variable 4 | 10 | 20 | 30 | 10 | 20 | 30 | 3 | no | yes | Attribute B |
| Variable 5 | 10 | 20 | 10 | 10 | 20 | 10 | 2 | no | yes* | Attribute B* |
| Variable 6 | 10 | 20 | 30 | 20 | 40 | 60 | 5 | no | no | unknown |
| Variable 7 | 0 | 2 | 0 | 0 | 0 | 2 | 2 | no | no | unknown |
| Variable 8 | 1 | 1.2 | 0.9 | 0.9 | 0.9 | 1 | 3 | no | no | unknown |

CLUSTERING OF DATA DIFFERENCES BY ATTRIBUTES

- Example: "Template" creation and application
  - Automated clustering of data differences by attributes within projects

|  | Drv1 | Drv2 | Drv3 | Drv4 | Drv5 | Drv6 | Total clusters | Cluster valuation |
|---|---|---|---|---|---|---|---|---|
| Attribute A "rated power" | 100 | 100 | 100 | 200 | 200 | 200 |  |  |
| Attribute B "country variant" | E | U | C | E | U | C |  |  |
| Variable 1 | 0 | 0 | 0 | 0 | 0 | 0 | 1 | equiv. data |
| Variable 2 | 1 | 2 | 3 | 4 | 5 | 6 | 6 | individual |
| Variable 3 | 1 | 1 | 1 | 2 | 2 | 2 | 2 | Attribute A |
| Variable 4 | 10 | 20 | 30 | 10 | 20 | 30 | 3 | Attribute B |
| Variable 5 | 10 | 20 | 10 | 10 | 20 | 10 | 2 | Attribute B* |
| Variable 6 | 10 | 20 | 30 | 20 | 40 | 60 | 5 | unknown |
| Variable 7 | 0 | 2 | 0 | 0 | 0 | 2 | 2 | unknown |
| Variable 8 | 1 | 1.2 | 0.9 | 0.9 | 0.9 | 1 | 3 | unknown |

CLUSTERING OF DATA DIFFERENCES BY ATTRIBUTES

- Example: "Template" creation and application
  - Analysis / Amendment of results (sizable effort with first run; less later)
    - Cluster assessment by responsible party

| | Drv1 | Drv2 | Drv3 | Drv4 | Drv5 | Drv6 | Total clusters | Cluster valuation | Assessment of responsible party |
|---|---|---|---|---|---|---|---|---|---|
| Attribute A "rated power" | 100 | 100 | 100 | 200 | 200 | 200 | | | |
| Attribute B "country variant" | E | U | C | E | U | C | | | |
| Variable 1 | 0 | 0 | 0 | 0 | 0 | 0 | 1 | equiv. data | OK |
| Variable 2 | 1 | 2 | 3 | 4 | 5 | 6 | 6 | individual | OK |
| Variable 3 | 1 | 1 | 1 | 2 | 2 | 2 | 2 | Attribute A | OK |
| Variable 4 | 10 | 20 | 30 | 10 | 20 | 30 | 3 | Attribute B | OK |
| Variable 5 | 10 | 20 | 10 | 10 | 20 | 10 | 2 | Attribute B* | OK |
| Variable 6 | 10 | 20 | 30 | 20 | 40 | 60 | 5 | unknown | NOK -> change template |
| Variable 7 | 0 | 2 | 0 | 0 | 0 | 2 | 2 | unknown | NOK -> change data&temp |
| Variable 8 | 1 | 1.2 | 0.9 | 0.9 | 0.9 | 1 | 3 | unknown | OK -> individual |

CLUSTERING OF DATA DIFFERENCES BY ATTRIBUTES

- Example: "Template" creation and application
  - Analysis / Amendment of results
    - Correction of actual state via data cleansing
    - Clustering amendment / refinement

| | Drv1 | Drv2 | Drv3 | Drv4 | Drv5 | Drv6 | Total clusters | Cluster valuation | Assessment of responsible party |
|---|---|---|---|---|---|---|---|---|---|
| Attribute A "rated power" | 100 | 100 | 100 | 200 | 200 | 200 | | | |
| Attribute B "country variant" | E | U | C | E | U | C | | | |
| Variable 1 | 0 | 0 | 0 | 0 | 0 | 0 | 1 | equiv. data | OK |
| Variable 2 | 1 | 2 | 3 | 4 | 5 | 6 | 6 | individual | OK |
| Variable 3 | 1 | 1 | 1 | 2 | 2 | 2 | 2 | Attribute A | OK |
| Variable 4 | 10 | 20 | 30 | 10 | 20 | 30 | 3 | Attribute B | OK |
| Variable 5 | 10 | 20 | 10 | 10 | 20 | 10 | 2 | Attribute B* | OK |
| Variable 6 | 10 | 20 | 30 | 20 | 40 | 60 | 5 | | NOK -> change template |
| Variable 7 | 0 | 2 | | 0 | 0 | 2 | 2 | | NOK -> change data&temp |
| Variable 8 | 1 | 1.2 | 0.9 | 0.9 | 0.9 | 1 | 3 | | OK -> individual |

CLUSTERING OF DATA DIFFERENCES BY ATTRIBUTES

- Example: "Template" creation and application
  - Template definition for further use

| | Drv1 | Drv2 | Drv3 | Drv4 | Drv5 | Drv6 | Total clusters | Template Project A |
|---|---|---|---|---|---|---|---|---|
| Attribute A "rated power" | | | | | | | | |
| Attribute B "country variant" | | | | | | | | |
| Variable 1 | | | | | | | | equiv. data |
| Variable 2 | | | | | | | | individual |
| Variable 3 | | | | | | | | Attribute A |
| Variable 4 | | | | | | | | Attribute B |
| Variable 5 | | | | | | | | Attribute B* |
| Variable 6 | | | | | | | | Attribute A&B |
| Variable 7 | | | | | | | | Attribute B* |
| Variable 8 | | | | | | | | individual |

CLUSTERING OF DATA DIFFERENCES BY ATTRIBUTES

- Example: "Template" creation and application
  - Validating newly generated data

|  | Drv.a | Drv.b | Drv.c | Drv.d | Drv.e | Drv.f | Total clusters |
|---|---|---|---|---|---|---|---|
| Attribute A "rated power" | 100 | 100 | 100 | 200 | 200 | 200 | |
| Attribute B "country variant" | E | U | C | E | U | C | |
| Variable 1 | 0 | 0 | 0 | 0 | 1 | 0 | 2 |
| Variable 2 | 6 | 5 | 4 | 3 | 2 | 1 | 6 |
| Variable 3 | 1 | 1 | 1 | 1 | 1 | 1 | 1 |
| Variable 4 | 20 | 30 | 40 | 20 | 30 | 40 | 3 |
| Variable 5 | 10 | 15 | 10 | 10 | 15 | 10 | 2 |
| Variable 6 | 10 | 10 | 10 | 20 | 20 | 20 | 2 |
| Variable 7 | 0 | 0 | 2 | 0 | 0 | 2 | 2 |
| Variable 8 | 1 | 1.2 | 0.9 | 1.2 | 0.9 | 1 | 3 |

CLUSTERING OF DATA DIFFERENCES BY ATTRIBUTES

- Example: "Template" creation and application
  - Validating newly generated data

| | Drv.a | Drv.b | Drv.c | Drv.d | Drv.e | Drv.f | Total clusters | Template Project A | Cluster valuation | Status |
|---|---|---|---|---|---|---|---|---|---|---|
| Attribute A "rated power" | 100 | 100 | 100 | 200 | 200 | 200 | | | | |
| Attribute B "country variant" | E | U | C | E | U | C | | | | |
| Variable 1 | 0 | 0 | 0 | 0 | | 0 | 2 | equiv. data | unknown | data |
| Variable 2 | 6 | 5 | 4 | 3 | 2 | 1 | 6 | individual | individual | OK |
| Variable 3 | 1 | 1 | 1 | | | | 1 | Attribute A | equiv. data | data |
| Variable 4 | 20 | 30 | 40 | 20 | 30 | 40 | 3 | Attribute B | Attribute B | OK |
| Variable 5 | 10 | 18 | 10 | 10 | 18 | 10 | 2 | Attribute B* | Attribute B* | OK |
| Variable 6 | 10 | | | 20 | | | 2 | Attribute A&B | | |
| Variable 7 | 0 | 0 | 2 | 0 | 0 | 2 | 2 | Attribute B* | Attribute B* | OK |
| Variable 8 | 1 | 1.2 | 0.9 | 1.2 | 0.9 | 1 | 3 | individual | unknown | OK |

CLUSTERING OF DATA DIFFERENCES BY ATTRIBUTES

- Example: "Template" creation and application
  - Validating newly generated data

|  | Drv.a | Drv.b | Drv.c | Drv.d | Drv.e | Drv.f | Total clusters | Template Project A |
|---|---|---|---|---|---|---|---|---|
| Attribute A "rated power" | 100 | 100 | 100 | 200 | 200 | 200 |  |  |
| Attribute B "country variant" | E | U | C | E | U | C |  |  |
| Variable 1 | 0 | 0 | 0 | 0 | 0 | 0 | 1 | equiv. data |
| Variable 2 | 6 | 5 | 4 | 3 | 2 | 1 | 6 | individual |
| Variable 3 | 1 | 1 | 1 |  |  |  | 2 | Attribute A |
| Variable 4 | 20 | 30 | 40 | 20 | 30 | 40 | 3 | Attribute B |
| Variable 5 | 10 | 15 | 10 | 10 | 15 | 10 | 2 | Attribute B* |
| Variable 6 | 10 | 10 | 10 | 20 | 20 | 20 | 2 |  |
| Variable 7 | 0 | 0 | 2 | 0 | 0 | 2 | 2 | Attribute B* |
| Variable 8 | 1 | 1.2 | 0.9 | 1.2 | 0.9 | 1 | 3 | individual |

CLUSTERING OF DATA DIFFERENCES BY ATTRIBUTES

- Example: "Template" creation and application
  - Template comparison on multiple projects
  - Parametric rule derivation Attribute x = <u>all</u> attribute values different
Attribute x* = <u>individual</u> attribute values different "soft" = <u>allowed</u>
"hard" = <u>required</u>

| | Template Project A | Template Project B | Template Project C | Template Project D | Parameteric rule |
|---|---|---|---|---|---|
| Attribute A "rated power" | | | | | |
| Attribute B "country variant" | | | | | |
| Variable 1 | equiv. data | equiv. data | equiv. data | equiv. data | equiv. data |
| Variable 2 | individual | individual | Attribute A | individual | individual |
| Variable 3 | Attribute A | individual | Attribute A | individual | Attribute A "soft" |
| Variable 4 | Attribute B | Attribute B | Attribute B | Attribute B | Attribute B "hard" |
| Variable 5 | Attribute B* | equiv. data | Attribute B* | equiv. data | Attribute B* "soft" |
| Variable 6 | Attribute A | Attribute B* | individual | equiv. data | unknown |
| Variable 7 | Attribute B* | equiv. data | equiv. data | equiv. data | equiv. data |
| Variable 8 | individual | individual | individual | individual | individual |

CLUSTERING OF DATA DIFFERENCES BY ATTRIBUTES

- Example: "Template" creation and application
  * Template comparison on multiple projects
  * Application of parametric rules for initial data population of new derivatives x = reliable population
x* = pre-population

| | DS a | DS b | DS c | DS d | DS e | DS f | Template Project A | Parametric rule | DS g | DS h |
|---|---|---|---|---|---|---|---|---|---|---|
| Attribute A "rated power" | 100 | 100 | 100 | 200 | 200 | 200 | | | 300 | 300 |
| Attribute B "country variant" | E | U | C | E | U | C | | | E | U |
| Variable 1 | 0 | 0 | 0 | 0 | 0 | 0 | equiv. data | equiv. data | 0 | 0 |
| Variable 2 | 6 | 5 | 4 | 3 | 2 | 1 | individual | individual | 7 | 8 |
| Variable 3 | 1 | 1 | 1 | 2 | 2 | 2 | Attribute A | Attribute A "soft" | 3* | 3* |
| Variable 4 | 20 | 30 | 40 | 20 | 30 | 40 | Attribute B | Attribute B "hard" | 20 | 30 |
| Variable 5 | 10 | 18 | 10 | 10 | 18 | 10 | Attribute B* | Attribute B "soft" | 10 | 18 |
| Variable 6 | 10 | | | 20 | | | Attribute A | unknown | 30 | 30 |
| Variable 7 | 0 | 0 | | 0 | 0 | | Attribute B* | equiv. data | 0 | 0 |
| Variable 8 | 1 | 1.2 | 0.9 | 1.2 | 0.9 | 1 | individual | individual | | |

CLUSTERING OF DATA DIFFERENCES BY ATTRIBUTES

- Example: "Template" creation and application
  - Template comparison on multiple projects
  - Parametric rule derivation Attribute x = <u>all</u> attribute values different
Attribute x* = <u>individual</u> attribute values different "soft" = <u>allowed</u>
"hard" = <u>required</u>

|  | Template Project A | Template Project B | Template Project C | Template Project D | Parameteric rule |
|---|---|---|---|---|---|
| Attribute A "rated power" | | | | | |
| Attribute B "country variant" | | | | | |
| Variable 1 | equiv. data | equiv. data | equiv. data | equiv. data | equiv. data |
| Variable 2 | individual | individual | Attribute A | individual | individual |
| Variable 3 | Attribute A | individual | Attribute A | individual | Attribute A "soft" |
| Variable 4 | Attribute B | Attribute B | Attribute B | Attribute B | Attribute B "hard" |
| Variable 5 | Attribute B* | equiv. data | Attribute B* | equiv. data | Attribute B* "soft" |
| Variable 6 | Attribute A | Attribute B* | individual | equiv. data | unknown |
| Variable 7 | Attribute B* | equiv. data | equiv. data | equiv. data | equiv. data |
| Variable 8 | individual | individual | individual | individual | individual |

What is claimed is:

1. A method for determining control data and/or calibrating a controller of a vehicle component, in particular at least one section of a drivetrain of a motor vehicle, wherein control data, on a basis of which the vehicle component is controlled, is stored in the controller, and wherein the method comprises the following working steps:

calibrating variants of the vehicle component;

identifying at least one first vehicle parameter of a plurality of vehicle parameters of the calibrated variants of the vehicle component which has different values for different calibrated variants including at least one of a rated power, an emission value, and/or a market specification;

if the calibrated variants differ in terms of the at least one first vehicle parameter, checking at least one portion of the control data of the calibrated variants for a pattern of dependency with the at least one first vehicle parameter;

if the pattern of dependency between the at least one portion of the control data and the at least one first vehicle parameter is detected, defining a calibration function for the at least one portion of the control data on a basis of the detected pattern of dependency with the at least one first vehicle parameter, wherein the calibration function is an assignment rule that associates at least a portion of the control data with a value based on a value of the at least one vehicle parameter;

determining control data of a variant of the vehicle component to be calibrated by means of the calibration function as a function of the at least one first vehicle parameter; and outputting the determined control data to the controller of the vehicle component.

2. The method according to claim 1, wherein when checking for the pattern of dependency between the at least one portion of the control data and the at least one first vehicle parameter, the same respective control parameter values of the control data of differently calibrated variants are assigned to a cluster, and wherein the pattern of dependency with the at least one first vehicle parameter is checked on a basis of the cluster.

3. The method according to claim 1, wherein no calibration function is provided for a portion of the control data not having any detected pattern of dependency to the at least one first vehicle parameter.

4. The method according to claim 1, wherein different control parameters have at least one of different calibration functions in relation to the at least one first vehicle parameter or different calibration functions in relation to respective different control parameters.

5. The method according to claim 1, further comprising the following working step:

parametrizing the controller of the variant of the vehicle component to be calibrated with the calibration function and/or the determined control data.

6. The method according to claim 5, further comprising the following working step:

conducting at least one test bench trial with a parametrized vehicle component to be calibrated or at least one road test with a vehicle having the parametrized vehicle component to be calibrated;

comparing actual values of vehicle component operating parameters to target values; and repopulating the controller of the vehicle component to be calibrated on a basis of deviations between the actual values and the target values of the vehicle component operating parameters.

7. The method according to claim 1, wherein the vehicle component comprises an internal combustion engine and the at least one first vehicle parameter is selected from the following group:

rated power, market specification, consumption value, emission value, drivability, or vehicle type.

8. The method according to claim 1, wherein the vehicle component comprises an internal combustion engine and the control data relates to at least one control parameter selected from the following group:

lambda control, logistics data, scavenging, catalytic converter heating, tank leak diagnosis, pedal characteristics, sound suppression, rpm, injection process start, droplet diameter, oxygen concentration, injecting duration, EGR rate, ignition delay, or mass fraction burn point and negative intake manifold pressure.

9. The method according to claim 1, wherein the pattern of dependency constitutes at least one selected from the following group:

an equivalency of a control parameter of the control data for the same values or characteristics of at least one second vehicle parameter, a linear dependence of the control parameter of the control data on the at least one first vehicle parameter for the same values or characteristics of the at least one second vehicle parameter, a polynomial dependence of the control parameter of the control data on the at least one first vehicle parameter for the same values or characteristics of the at least one second vehicle parameter, or a statistical dependence of the control parameter of the control data on the at least one first vehicle parameter for the same values or characteristics of the at least one second vehicle parameter.

10. The method according to claim 1, wherein the pattern of dependency applies to at least two groups of variants with the respective same values/characteristics of the at least one first vehicle parameter and respective different values/characteristics of at least one second vehicle parameter, wherein compared to a second group, a first group exhibits different values or characteristics of the at least one first vehicle parameter and the same values or characteristics of the at least one second vehicle parameter.

11. The method according to claim 1, wherein all the working steps are automated, in particular by a system for calibrating the controller of the vehicle component.

12. A method for generating a calibration function and/or for calibrating a controller of a vehicle component, wherein control data, on a basis of which the vehicle component is controlled, is stored in the controller, and wherein the method comprises the following working steps:

calibrating variants of the vehicle component;

identifying at least one first vehicle parameter of a plurality of vehicle parameters of the calibrated variants of the vehicle component which has different values for different calibrated variants;

if the calibrated variants differ in terms of the at least one first vehicle parameter, checking at least one portion of the control data of the calibrated variants for a pattern of dependency with the at least one first vehicle parameter;

if the pattern of dependency between the at least one portion of the control data and the at least one first vehicle parameter is detected, defining a calibration function for the at least one portion of the control data on a basis of the detected pattern of dependency with the at least one first vehicle parameter, wherein the calibration function is an assignment rule that associates at least a portion of the control data with a value based on a value of the at least one vehicle parameter; and outputting the calibration function.

13. A method for calibrating a controller of a vehicle component wherein control data, on a basis of which the vehicle component is controlled, is stored in the controller, wherein there are multiple variants of the vehicle component differing by at least one first vehicle parameter, and wherein the method comprises the following working steps:
   determining control data of a variant of the vehicle component to be calibrated by means of a calibration function as a function of the at least one first vehicle parameter, wherein the calibration function is based on a pattern of dependency between at least one portion of the control data of a plurality of already calibrated variants of the vehicle component and the at least one first vehicle parameter; and
   outputting the determined control data.

14. A method for calibrating a controller of a vehicle component, wherein control data, on a basis of which the vehicle component is controlled, is stored in the controller, wherein there are multiple variants of the vehicle component differing by at least one first vehicle parameter, and wherein the method comprises the following working steps:
   checking the control data of a previously parametrized variant of the vehicle component to be calibrated by means of a calibration function in accordance with the at least one first vehicle parameter, wherein the calibration function is based on a pattern of dependency between at least one portion of the control data of a plurality of already calibrated variants of the vehicle component and the at least one first vehicle parameter; and
   if the checked control data deviates from the calibration function, outputting a notification of a deviation.

15. The method according to claim 14, further comprising the following working step:
   correcting the deviation of the checked control data from the calibration function in the controller of the variant to be calibrated.

16. A non-transitory computer-readable storage medium having stored thereon a computer program, that when executed by one or more processors cause to be performed a method for determining control data or calibrating a controller of a vehicle component, wherein control data, on a basis of which the vehicle component is controlled, is stored in the controller, wherein the method comprises:
   calibrating variants of the vehicle component;
   identifying at least one first vehicle parameter of a plurality of vehicle parameters of calibrated variants of the vehicle component which has different values for different calibrated variants including at least one of a rated power, an emission value, or a market specification;
   if the calibrated variants differ in terms of the at least one first vehicle parameter, checking at least one portion of the control data of the calibrated variants for a pattern of dependency with the at least one first vehicle parameter;
   if the pattern of dependency between the at least one portion of the control data and the at least one first vehicle parameter is detected, defining a calibration function for the at least one portion of the control data on a basis of the detected pattern of dependency with the at least one first vehicle parameter, wherein the calibration function is an assignment rule that associates at least a portion of the control data with a value based on a value of at least one vehicle parameter;
   determining control data of a variant of the vehicle component to be calibrated by means of the calibration function as a function of the at least one first vehicle parameter; and
   outputting the determined control data to the controller of the vehicle component.

17. A system for calibrating a controller of a vehicle component, in particular at least one section of a drivetrain of a motor vehicle, wherein control data, on a basis of which the vehicle component is controlled, is stored in the controller, comprising:
   a first interface for importing the control data and a plurality of vehicle parameters of already calibrated variants of the vehicle component and vehicle components of at least one variant to be calibrated;
   a processing unit configured to identify at least one first vehicle parameter of the plurality of vehicle parameters of already calibrated variants of the vehicle component, wherein the at least one first vehicle parameter is different for different already calibrated variants, for checking at least one portion of the control data of the already calibrated variants for a pattern of dependency with the at least one first vehicle parameter, for defining a calibration function for the at least one portion of the control data on a basis of the pattern of dependency with the at least one first vehicle parameter, wherein the calibration function is an assignment rule that associates at least a portion of the control data with a value based on a value of at least one vehicle parameter, and for determining control data of a vehicle component variant to be calibrated on a basis of the calibration function; and
   a second interface for outputting determined control data to the controller of the vehicle component.

18. The system for calibrating a controller of a vehicle component according to claim 17, wherein the second interface is further configured to write the control data to the controller.

* * * * *

UNITED STATES PATENT AND TRADEMARK OFFICE
CERTIFICATE OF CORRECTION

PATENT NO. : 10,787,982 B2
APPLICATION NO. : 15/774098
DATED : September 29, 2020
INVENTOR(S) : Thomas Kaserer et al.

It is certified that error appears in the above-identified patent and that said Letters Patent is hereby corrected as shown below:

In the Claims

Column 63, Claim 1, Lines 2-3, "control data and/or calibrating a controller" should read --control data or calibrating a controller--; Claim 1, Lines 14-15, "an emission value, and/or a market specification;" should appear as follows --an emission value, or a market specification;--; Claim 5, Lines 58-59, "the calibration function and/or the determined control data" should read --the calibration function or the determined control data--.

Column 64, Claim 12, Lines 50-51, "for generating a calibration function and/or for calibrating" should appear as follows --for generating a calibration function or for calibrating--.

Signed and Sealed this
Fourth Day of May, 2021

Drew Hirshfeld
*Performing the Functions and Duties of the
Under Secretary of Commerce for Intellectual Property and
Director of the United States Patent and Trademark Office*